United States Patent

[11] 3,610,682

| [72] | Inventor | Theodorus Hendricus Vermeulen<br>Heemstede, Netherlands |
|---|---|---|
| [21] | Appl. No. | 826,617 |
| [22] | Filed | May 21, 1969 |
| [45] | Patented | Oct. 5, 1971 |
| [73] | Assignee | Vermeulen-Hollandia<br>Netherlands |
| [32] | Priority | May 28, 1968, May 28, 1968 |
| [33] | | Netherlands |
| [31] | | 6807531 and 6807532 |

[54] SLIDING ROOF CONSTRUCTION FOR A VEHICLE
13 Claims, 7 Drawing Figs.

[52] U.S. Cl. .................................. 196/137 E,
296/137 H
[51] Int. Cl. ......................................... B60j 7/10
[50] Field of Search ................................ 296/137 E,
137 F, 137 H

[56] References Cited
UNITED STATES PATENTS
2,014,284  9/1935  Mobbs........................  296/137 E

| 3,075,806 | 1/1963 | Gmeiner et al. ............... | 296/137 F |
| 3,031,226 | 4/1962 | Larche ........................ | 296/137 F |
| 3,050,336 | 8/1962 | Werner ........................ | 296/137 E |

FOREIGN PATENTS

| 465,339 | 9/1935 | Great Britain ................ | 296/137 |
| 413,116 | 6/1933 | Great Britain ................ | 296/137 H |

Primary Examiner—Benjamin Hersh
Assistant Examiner—Robert R. Song
Attorney—Waters, Roditi, Schwartz & Nissen ABSTRACT: A construction is disclosed for fitting a sliding panel of a sliding roof in a vehicle, in particular an automobile. An inner frame of the sliding panel is supported in guides carried by the vehicle and the operating mechanism mounted on the inner frame is adjusted, whereupon an upper panel is connected to the inner frame. The inner frame and the upper panel are interconnected along the front side only, while at least one spring carried by the inner frame acts upon the upper panel, near the rear side thereof, and exerts a downward force on the upper panel.

PATENTED OCT 5 1971

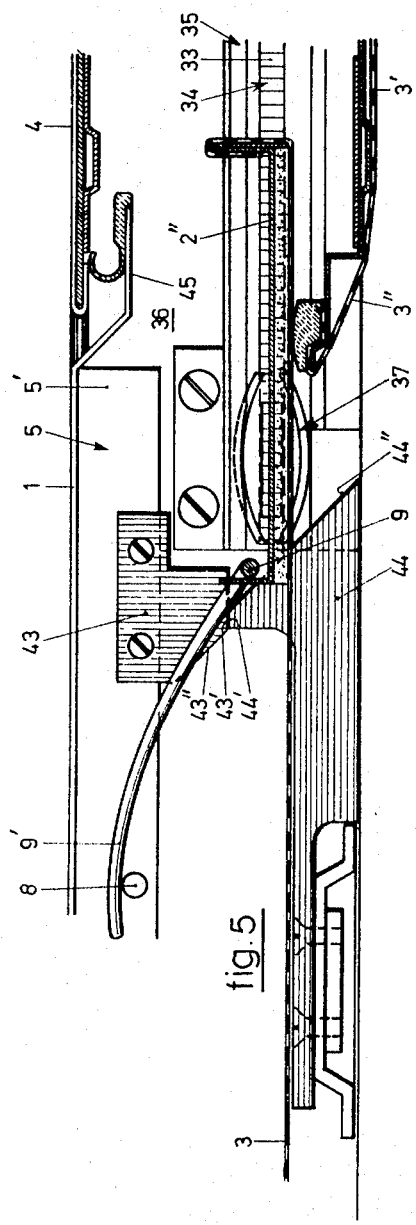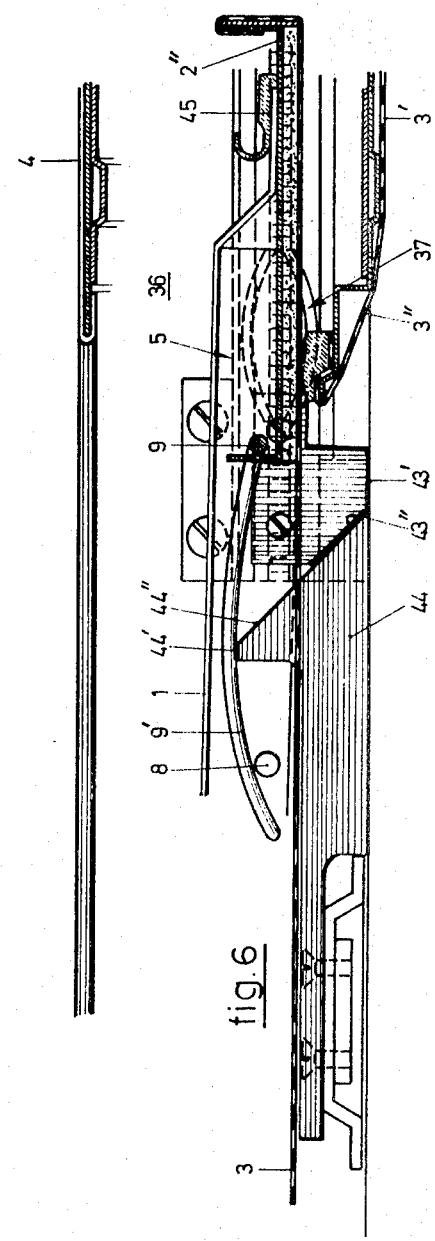

A SLIDING ROOF CONSTRUCTION FOR A VEHICLE

BACKGROUND OF THE INVENTION

The invention relates to a method for fitting a sliding panel of a sliding roof in a vehicle, in particular an automobile, as well as to a sliding roof for a vehicle equipped with a sliding panel.

In fitting a sliding roof in a vehicle, it has been common practice first to assemble the sliding panel to a unit with the operating mechanism accommodated therein, whereupon said sliding panel is fitted as a whole in the vehicle and is supported by its runners in guides carried by the vehicle. Since the runners connected with the sliding panel are not easily accessible, and since the operating mechanism accommodated in the sliding panel is practically unadjustable, fitting the sliding panel in the vehicle constitutes a particularly difficult and time-consuming task.

SUMMARY OF THE INVENTION

It is an object of the present invention to provide a method for fitting a sliding panel of a sliding roof in a vehicle, which offers substantial advantages in this respect.

According to the invention this method is characterized in that first an inner frame of the sliding panel is supported in the guides carried by the vehicle and the operating mechanism mounted on said inner frame is adjusted, whereupon an upper panel is connected to said inner frame.

In this manner the fitting of the sliding panel in the vehicle is greatly simplified.

The invention further relates to a sliding roof for a vehicle, in particular an automobile, comprising a sliding panel which is slidable between a closed position and an opened position and which is fitted by the method described hereinabove.

In a preferred embodiment of the sliding roof according to the invention, the inner frame and the upper panel are interconnected along the front side only, while at least one spring carried by the inner frame acts upon the upper panel, near the rear side thereof and exerts a downward force on said upper panel.

In this embodiment, a plate member extending downwardly along the front of the upper panel may be connected by means of screws to a plate member extending upwardly along the front of the inner frame.

A very important embodiment of the sliding roof according to the invention is characterized in that the lower frame is supported on both sides in rectilinear and substantially horizontal guides, while the upper panel carries on both sides, in the vicinity of the rear edge, a cam having a lower supporting surface which passes into an upwardly and forwardly inclined guide face, each cam resting, in the closed position of the sliding panel, under spring pressure and with a small bearing surface, upon a cam rigidly connected with the vehicle, and having a substantially horizontal bearing surface extending in the longitudinal direction of the vehicle and passing into a downwardly and backwardly inclined guide face, such that, when the sliding panel is moved from the closed position, the supporting surfaces of the first-mentioned cams practically immediately leave the bearing surfaces of the fixed cams, whereupon the first-mentioned cams slide downwardly and their inclined guide faces along the inclined guide faces of the underlying cams, and the upper panel swings down about its front connection with the inner frame, until the rear side of the upper panel comes to rest under spring pressure upon the inner frame, while, conversely, during the final period of the closing motion of the sliding panel, the inclined guide faces of the first-mentioned cams slide upwardly along the inclined guide faces of the fixed cams, during which operation the upper panel, moving against the spring pressure, swings back to its initial position, while, in the closed position, the supporting surfaces of the first-mentioned cams rest again upon the bearing surfaces of the fixed cams.

The invention further relates to a sliding roof for a vehicle, in particular an automobile, wherein the locking of the sliding panel with respect to the fixed roof is accomplished by means of two aligned locking members adapted to be moved in the transverse direction of the vehicle by means of a handle provided on the front side of the sliding panel and displacing, upon operation, a control member for the locking members which extends longitudinally with respect to the vehicle, said handle serving at the same time for moving the sliding panel.

In order to provide a particularly compact and easily manufactured working connection between the control member and the locking members, said control member may comprise a rear operating plate provided with cam-shaped driving faces which cooperate with cam rollers fitted on the inner ends of the locking members.

In a simple embodiment of the sliding roof according to the invention, the operating plate has an opening, within which the two cam rollers extend, the lateral edges of this opening constituting the cam-shaped driving faces for said cam rollers.

The cam-shaped driving face for each cam roller may comprise a backwardly and outwardly inclined portion and, behind this, a backwardly and inwardly inclined portion, said portions being interconnected by a junction, in such a way that the locking members occupy the locked position when the cam rollers are in contact with the said junctions, whereas, when the cam rollers engage the said backwardly and outwardly inclined portions or the said backwardly and inwardly inclined portions, the said locking members are displaced towards the unlocked position.

According to a further important embodiment of the invention, each locking member comprises at its end at least one tooth which meshes with a fixed rack extending longitudinally with respect to the vehicle.

In this arrangement, each locking member may comprise at its free end a locking strip, which is provided with the said tooth or teeth and which is passed through a runner, which is supported by the sliding roof and which cooperates with a U-shaped guide rail extending longitudinally with respect to the vehicle, the said rack being fitted on the web of the said guide rail.

BRIEF DESCRIPTION OF THE DRAWING

The invention will be further explained with reference to the drawing, which represents an embodiment of a sliding roof according to the invention.

FIG. 5 is a longitudinal section of the rear part of the sliding panel in the closed position, and of the associated guide system.

FIG. 6 is a longitudinal section corresponding to that of FIG. 5, with the sliding panel in a partly opened position.

DESCRIPTION OF THE PREFERRED EMBODIMENT

Figure 1:
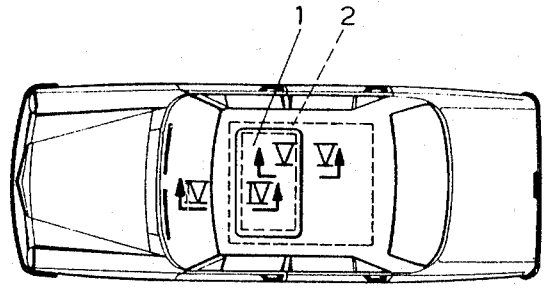
FIG. 1 shows a vehicle incorporating a sliding roof construction according to the present invention.
Figure 7:
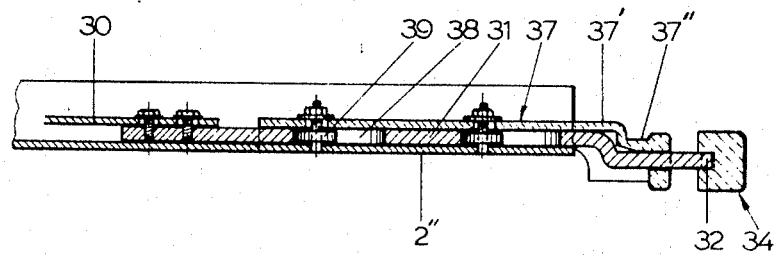
FIG. 7 shows a detailed sectional view of the air guide system.
Figure 2:
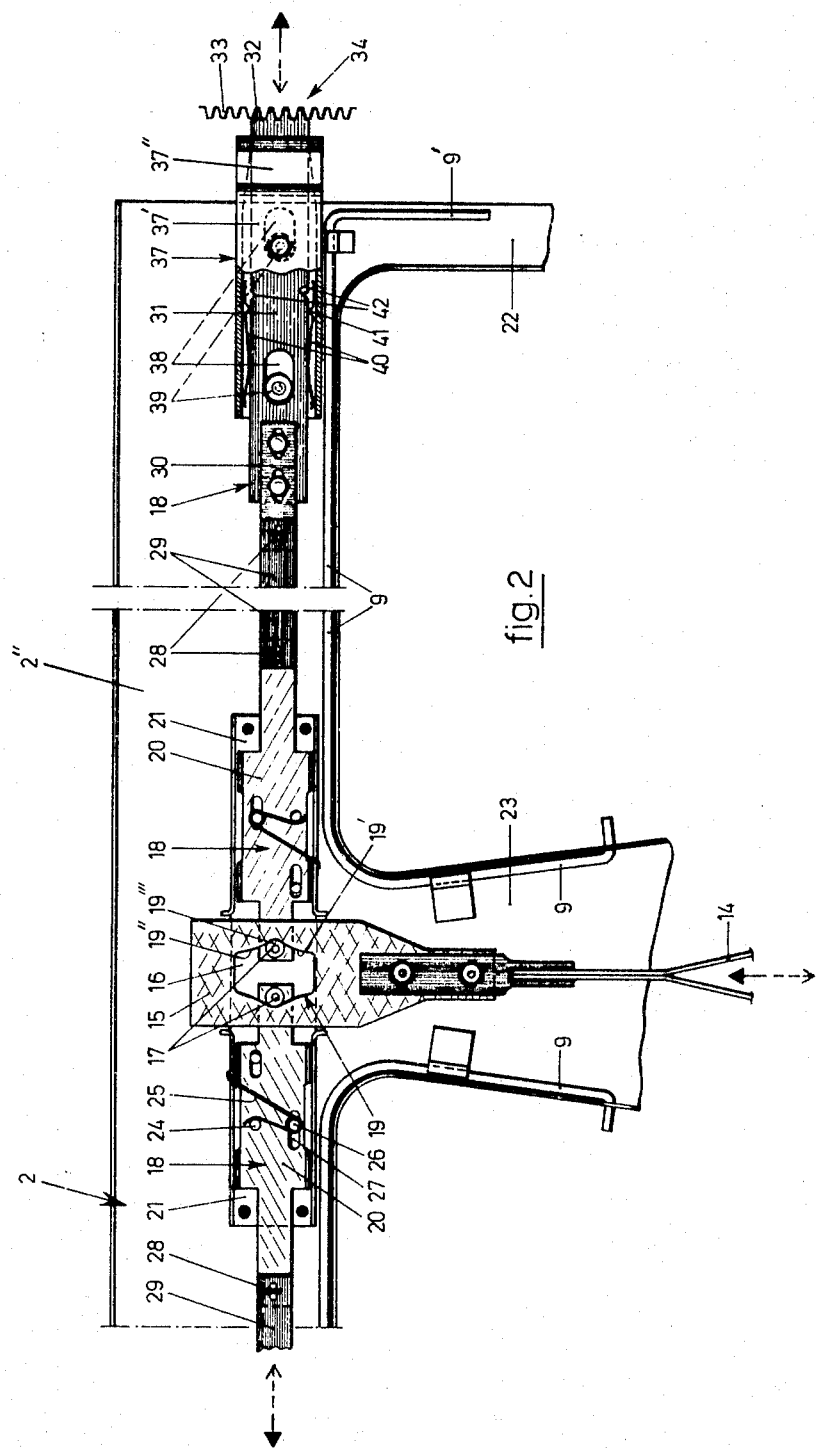
FIGS. 2 and 3 are top views of a portion of a sliding roof according to the invention, wherein the upper panel has been removed.

The sliding roof according to the invention, as shown in the drawing, comprises a sliding panel composed of an upper panel 1 and an inner frame 2. The inner frame 2 is lined on the lower side with an inner covering 3, made of textile, plastic or a similar material, and adjoining, in the closed position of the sliding panel, an inwardly and upwardly inclined edge portion 3'' of the inner covering 3' of the fixed roof 4.

The upper panel 1 and the inner frame 2 are detachably connected to each other on their front side only. To this end, an angle section 5 fitted along the front of the upper panel 1 in a folded edge of said upper panel 1 is connected by its downward leg 5', by screws 6, to an upward leg 7' of an angle section 7, which is fitted on the front member 2' of the inner frame 2. This connection between the upper panel 1 and the inner frame 2 allows a certain slewing motion of the upper panel 1 with respect to the inner frame 2 about their front connection, the purpose of which will be further explained hereinafter.

The upper panel 1 also bears an angle section 5 on either side which is likewise fitted in a folded edge of the upper panel 1. Lateral pins 8 are fitted to the downward legs 5' of these lateral angle sections 5 in the vicinity of the rear edge of the upper panel 1. Above these pins 8, the free ends 9' of torsion springs 9 extend, which springs are fitted on the inner frame 2, and exert a downward force on the upper panel 1.

The inner frame 2 has an opening which accommodates a cup 10. The lateral walls 10' of the cup 10 contain horizontal slots 11 extending longitudinally with respect to the vehicle.

Two headed pins 12 are passed through each slot 11 and are connected, by means of a threaded end portion, to handle 13 which is completely accommodated in the cup 10. The pins 12 are further passed through holes in an operating clamp 14, which is connected to the handle 13 in this manner and which follows any displacement of the handle 13.

The rear end of the operating clamp 14 is adjustably connected to a horizontal operating plate 15. This operating plate 15 has an opening 16 within which two cam rollers 17 extend, which are journaled on the inner ends of two locking members 18. These locking members 18 are movable in the transverse direction of the vehicle and are aligned with respect to each other.

The edges of the opening 16 form cam-shaped driving faces 19 which cooperate with the cam rollers 17. The driving face 19 for each cam roller 17 comprises a backwardly and outwardly inclined portion 19' and, adjoining thereto, a backwardly and inwardly inclined portion 19''.

When the handle 13 occupies the central position, the cam rollers 17 engage the junction 19''' between the adjoining portions 19' and 19'' of the driving faces 19 and the locking members 18 are in their outer or locked position.

When the handle 13 occupies its front or rear position in the cup 10, the cam rollers 17 engage the rear ends of the driving face portions 19'' of the front ends of the driving face portions 19', respectively, which, in the transverse direction of the vehicle, are at such a distance from each other, that the locking members 18 occupy their inner or unlocked position.

Each locking member 18 comprises a sliding plate 20 on which the corresponding cam roller 17 is journaled and which has a close sliding fit in a base plate 21 which extends in the transverse direction of the vehicle; this base plate 21 has a raised front and rear edge and is secured on the rear member 2'' of the inner frame 2. This rear member 2'' is connected to the front member 2' by means of side members 22 and a middle member 23.

Each sliding plate 20 carries a pin 24 against which one end of a spring 25 rests. These springs press the sliding plates 20 in the outward direction. Each spring 25 is wound around a pin 26, which is connected to the base plate 21 and projects through a slot 27 in the corresponding sliding plate 20, thus allowing a transverse displacement of this sliding plate 20 with respect to the base plate 21. The other end of each spring 25 engages a cutout portion of the raised front edge or rear edge of the base plate 21. The base plate 21 bears a cover (not shown), which retains the operating plate 15 and the springs 25.

The outer end of each sliding plate 20 bears a pin, provided with a head 28, which is passed through a hole in a connecting strip 29. A coiled pressure spring (not shown) around the shank portion of the pin biases the connecting strip 29 toward the under side of the head 28 of the pin. Each connecting strip 29 is resiliently connected in a similar manner to an adjusting strip 30, which is adjustably attached to a locking strip 31, which is made of metal or a plastic material. This locking strip 31 comprises a number of teeth 32 at its free end. Each locking strip 31, together with its adjusting strip 30, its connecting strip 29 and its sliding plate 20 with cam roller 17 thus forms the locking member 18. The teeth 32 of each locking strip 31 mesh with teeth 33 of a rack 34 of metal or a plastic material which extends longitudinally with respect to the vehicle and which is mounted on the web of a U-shaped guide rail 35, inside this guide rail. The guide rails 35 are likewise made of metal or a plastic material and occupy a substantially horizontal position.

Figure 3:
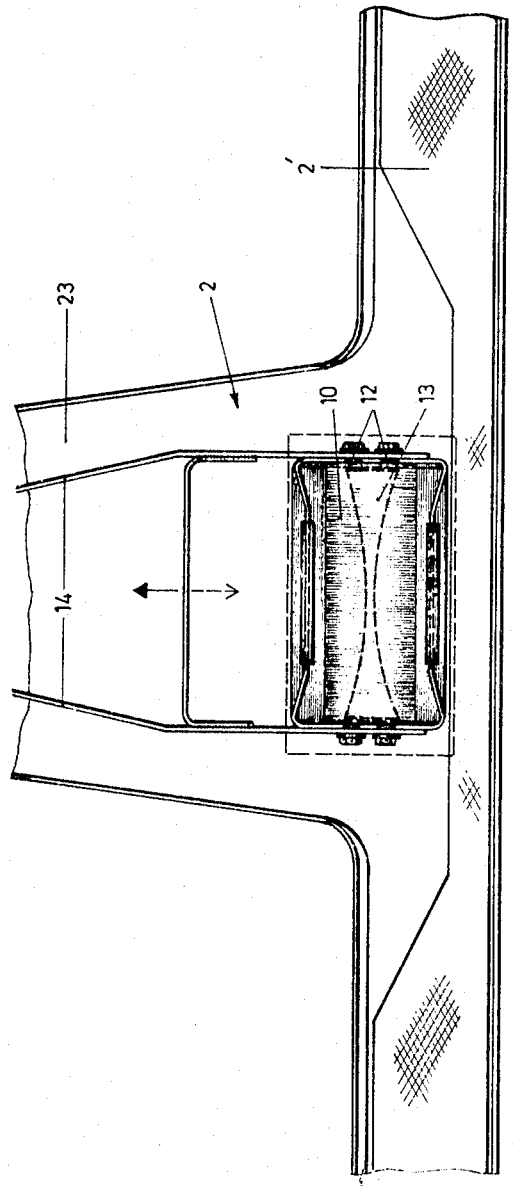

The guide rails 35 are fastened on either side of the sliding panel to a frame 36, which is attached to the upper structure as shown in FIG. 3 of the drawing to the body of the vehicle and which is furthermore fastened to the fixed roof 4.

Each locking strip 31 extends through a recess in the overlying part 37' of a runner 37 which is made of plastic material and which is carried by the rear member 2'' of the inner frame 2. The head portion 37'' of each runner 37 is downwardly staggered with respect to the part 37' and cooperates with the corresponding guide rail 35. This head portion 37'' has a slot, through which the outer part of the corresponding locking strip 31, which is likewise downwardly staggered, passes.

The locking strip 31 of each locking member 18 has two guide slots 38 through which guide pins 39 protrude. These guide pins are connected on the rear member 2'' of the inner frame 2. Each runner 37 is adjustably fastened on the corresponding pins 39 by means of bolts.

Two leaf springs 40 extend between the side edges of each locking strip 31 and the downward side edges of the corresponding runner 37. The leaf springs 40 are attached to the runner 37. Each leaf spring 40 comprises an inward cam 41 which cooperates with a recess 42 in the relevant side edge of the locking strip 31.

The inner frame 2 bears on either side, besides the aforementioned runner 37, which is displaceable in the corresponding guide rail 35, another, nonadjustable runner (not shown), carried by the front member 2' of the inner frame 2, which likewise cooperates with a substantially horizontal guide rail.

When the sliding panel is displaced from the closed position to the opened position or conversely, the inner frame 2 thus traverses a substantially horizontal path between the fixed roof 4 and the underlying inner covering 3'.

A cam 43 of plastic material is fastened by means of screws to the downward leg 5' of each lateral angle section 5 which is connected to the upper panel 1 and which further carries the aforementioned pin 8. Each of the two cams 43 is positioned in the vicinity of the rear edge of the upper panel 1. Each cam 43 has a substantially horizontal supporting surface 43', which passes into an upwardly and forwardly inclined guide face 43''.

In the closed position of the sliding panel, the two cams 43, each rest, under the influence of the torsion springs 9, on a cam 44, made of plastic material and rigidly connected to the frame 36 on both sides thereof. These cams 44 have a substantially horizontal bearing face 44' extending in the longitudinal direction of the vehicle and passing into a downwardly and backwardly inclined guide face 44''.

Figure 4:
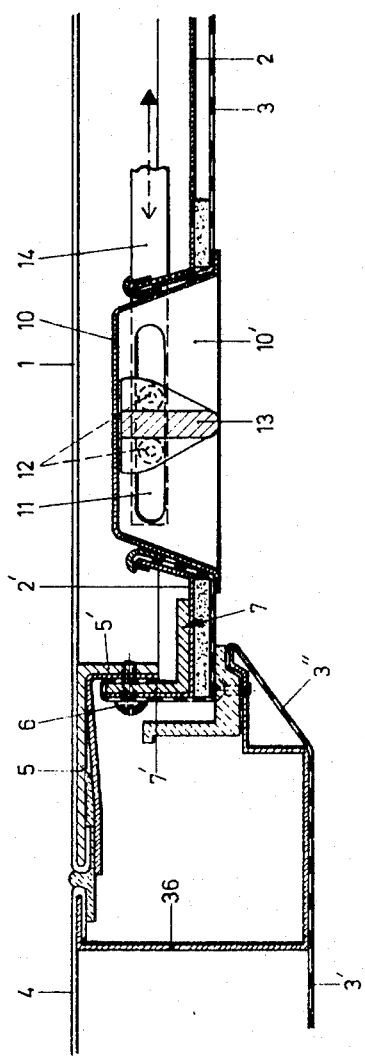
FIG. 4 is a longitudinal section of the front part of the sliding panel in the closed position, and of the adjoining front portion of the fixed roof.

When the sliding panel is displaced from the closed position shown in FIG. 4, the supporting surfaces 43' of the two cams 43 will practically immediately leave the bearing surfaces 44' of the two underlying cams 44, whereupon the cams 43, under the influence of the torsion springs 9, slide downwardly with their inclined guide faces 43'' along the inclined guide faces 44'' of the cams 44. In the course of this operation the upper panel 1 is swung about its front connection with the inner frame 2, until the rear member 45 of the upper panel 1 comes to rest on the rear member 2'' of the inner frame 2. The upper panel 1 follows the further motion of the inner frame 2 towards the opened position.

Conversely, during the final period of the closing motion of the sliding panel, the inclined guide faces 43'' of the cams 43 will slide upwardly along the inclined guide faces 44'' of the cams 44. In the course of this operation the upper panel 1 swings back to its initial position against the pressure of the torsion springs 9, while, in the closed position, the supporting surfaces 43' of the cams 43 again come to rest upon the bearing surface 44' of the cams 44.

Thus the upper panel 1, in the closed position of the sliding panel, practically adjoins the fixed roof 4, while this upper panel 1, when the sliding panel is opened, nevertheless can be moved under the fixed roof 4, without any damage to the paintwork of the fixed roof 4 or the upper panel 1. When the sliding panel is opened, the torsion springs 9 force the upper panel 1 to move downwardly. In the course of this movement any possible suction of the outside air is efficiently overcome.

The operation of the sliding roof according to the invention as described hereinabove is as follows:

If the sliding panel has to be displaced from the closed position to an entirely or partly opened position, the handle 13 is grasped from the front side and is pressed backwardly. The pins 12 then first pass through the slots 11, and the operating plate 15 is displaced backwardly by means of the operating clamp 14. In the course of this operation the portions 19' of the cam-shaped driving faces 19 displace the cam rollers 17 of the locking members 18 inwardly, causing the teeth 32 of the locking strips 31 to disengage the teeth 33 of the racks 34.

At the same time, the cams 41 of the leaf spring 40 engage the lateral recesses 42 in the locking strips 31.

As the handle 13 is pressed backwardly further, the sliding panel is displaced in the backward direction. In the course of this operation the head portions 37'' of the rear runners 37 of the inner frame 2 are displaced in the guide rails 35, and the front runners (not shown) are likewise displaced in their guide rails. The upper panel 1 swings downwardly almost immediately until its rear member 45 rests on the rear member 2'' of the inner frame 2, as a result of the cooperation, described hereinbefore, between the cams 43 and 44.

Since, during the displacement of the sliding panel, the cams 41 of the leaf springs 40, engage the lateral recesses 42 of the locking strips 31, so that a return of the locking strips 31 towards the locked position is counteracted, it is effectively prevented that the teeth 32 of the locking strips 31 would reengage the teeth 33 of the racks 34 if the handle 13 were to return slightly towards its middle or rest position on account of abrupt handling (such as could occur particularly, if the sliding panel is very readily displaceable, running ahead, as it were, of the handle 13). The cooperation of the cams 41 of the leaf springs 40 and the lateral recesses 42 in the locking strips 31 is such, that the leaf springs 40, during the very brief period of time that the above danger occurs, can resist the force of the springs 25 which tend to displace the locking members 18 in the outward direction to the locked position.

However, as soon as the desired opened position of the sliding panel is reached, and the handle 13 is released, the force of the springs 25 will overcome the force of engagement of the cams 41 of the leaf springs 40 in their recesses 42 in the locking strips 31, whereupon the locking members 18 return to the locked position.

At the same time, the cam rollers 17 effect the return displacement of the operating plate 15 to the position in which the cam rollers 17 are in contact with the junctions 19''' of the driving faces 19. In the course of this operation the handle 13 returns to its middle or rest position.

As an alternative for the use of the leaf springs 40 with their inward cam 41 and of the lateral recesses 42 of the locking strips 31 cooperating therewith, it is also possible to form the opening 16 in the operating plate 15 in such manner that the cam roller 17 are exposed to a minor locking action in the unlocked position of the locking members 18 so as to be able to resist, in the same manner as the leaf springs 40, the force of the springs 25 for a very brief period of time, in order to prevent rattling of the teeth 32 over the teeth 33 during the opening and closing movement of the sliding panel. To this end, the front portions of the driving faces 19' may be slightly divergent in the forward direction, and the rear portions of the driving faces 19'' may be slightly divergent in the backward direction.

For closing the sliding panel, the handle 13 is manually pressed in the forward direction, causing the locking members 18, to be moved to the unlocked position in the same manner as described hereinabove.

At the end of the closing movement, the upper panel 1 is swung upwardly by the cooperating cams 43, 44, and, after the handle 13 is released, the sliding panel is locked with respect to the fixed roof 4.

In view of the fact that the upper panel 1 can be connected to the inner frame 2 after the said inner frame 2 has been fitted in the vehicle, the important advantage is obtained that the adjustment of the entire locking mechanism, as well as of the runners 37, is greatly simplified, since this can be accomplished prior to the installation of the upper panel 1. After the locking mechanism and the runners 37 have obtained their correct position, the torsion springs 9 are brought in engagement with the pins 8, whereupon the connection of the angle section 5 along the front of the upper panel 1 to the angle section 7, which is fastened to the front member 2' of the inner frame 2, is accomplished.

The invention is not restricted to the embodiment shown in the drawing, which may be modified in various manners within the scope of the appended claims.

I claim:

1. A sliding roof for a vehicle, comprising a sliding panel movable between a closed position and an open position, said sliding panel including an inner frame adapted to be supported in guides carried by said vehicle, an operating mechanism mounted on said inner frame for moving the sliding panel between open and closed positions, an upper panel having front and rear edges and connected to said inner frame only along the front edges of the upper panel and of the inner frame spring means carried by said inner frame and acting upon said upper panel adjacent the rear edge thereof to exert a downward force on said upper panel, and cam means connected to the vehicle and in operative contact with said upper panel during the final period of the closing movement of the sliding panel to swing the upper panel upwards about its front connection with the inner frame, said cam means being operative to permit lowering of said rear edge of the upper panel when said sliding panel is moved rearwardly from the closed position, whereafter said upper panel swings down about its front connection with the inner frame, until the rear side of the upper panel comes to rest under the pressure of said spring means upon said inner frame.

2. A sliding roof according to claim 1 comprising a first plate member extending downwardly along the front edge of said upper panel, and a second plate member extending upwardly along the front of said inner frame and connected to said first plate member.

3. A sliding roof according to claim 1, wherein said spring means comprises two torsion springs mounted on said inner frame, each said torsion spring having a laterally situated free end for operatively engaging the corresponding side of said upper panel.

4. A sliding roof according to claim 1, wherein the lower frame is supported on both sides in rectilinear and substantially horizontal guides, said cam means comprising first cams, the upper panel carrying said first cams on both sides thereof at said rear edge of the upper panel, each said first cam having a lower supporting surface which extends into an upwardly and forwardly inclined guide face, a pair of further cams rigidly connected with the vehicle and having a substantially horizontal bearing surface extending in the longitudinal direction of the vehicle and an inclined guide face extending from said bearing surface in a downwardly and rearwardly inclined direction, each of the first said cams resting, in the closed position of the sliding panel, under pressure of said spring means on said bearing surfaces of the further cams such that, when said sliding panel is moved from the closed position, the supporting surfaces of said first cams disengage the bearing surfaces of the further cams, and said first cams slide downwardly by their inclined guide faces riding along the inclined guide faces of the further cams, whereby said upper panel swings down about its front connection with the inner frame, until the rear edge of the upper panel comes to rest under the pressure of said spring means upon said inner frame, while, conversely, during the final period of the closing motion of the sliding panel, the inclined guide faces of said first cams ride upwardly along the inclined guide faces of the further cams, during which operation the upper panel, moving against the pressure of the spring means swings back to its closed position, and, in said closed position, the supporting surfaces of said first cams again rest upon the bearing surfaces of the further cams.

5. A sliding roof for a vehicle comprising a sliding panel having front and rear sides, means for locking the sliding panel to a fixed roof portion of said vehicle, said means comprising two aligned locking members adapted to be moved in the transverse direction of the vehicle, a handle mounted on the front side of the sliding panel for effecting movement of said locking members, a control member operatively coupled to said handle and to said locking members and extending longitudinally with respect to the vehicle to effect movement of the locking members upon operation of said handle while concurrently the handle moves said sliding panel, said control member including a rear operating plate provided with cam-shaped driving faces and cam rollers fitted on said locking members and cooperatively engaged with said cam-shaped driving faces.

6. A sliding roof according to claim 5, wherein said operating plate includes an opening into which said two cam rollers extend, the lateral edges of this opening being dimensioned to form said cam-shaped driving faces for said cam rollers.

7. A sliding roof according to claim 6, wherein the cam-shaped driving face for each of said cam rollers comprises a rearwardly and outwardly inclined portion and, contiguous therewith, a rearwardly and inwardly inclined portion, and a juncture for said portions, said locking members occupying the locked position, when the cam rollers are in contact with said juncture, and when said cam rollers engage one of said inclined portions said locking members are displaced towards their unlocked position.

8. A sliding roof according to claim 5, comprising spring means biassing said locking members towards a locked position.

9. A sliding roof according to claim 5, wherein each locking member has a free end and includes thereat at least one tooth, and a rack fastened to and extending longitudinally with respect to the vehicle for meshing with said tooth in the locked position.

10. A sliding roof according to claim 9, including a locking strip at the free end of each of said locking members, said locking strip being provided with said tooth, a runner supported by said sliding roof and receiving said strip, and a fixed U-shaped guide rail extending longitudinally with respect to the vehicle and slidably receiving said runner, said rack being on said guide rail.

11. A sliding roof according to claim 10, including leaf springs supported adjacent said locking strips, each leaf spring including a cam adapted to engage a recess provided in said locking strip in the unlocked position of said locking member.

12. A sliding roof according to claim 10, wherein said locking strips are made of a plastic material.

13. A sliding roof according to claim 10, wherein each rack and the associated guide rail are integrally moulded of a plastic material.